United States Patent
Wang

(10) Patent No.: US 10,490,148 B2
(45) Date of Patent: Nov. 26, 2019

(54) DISPLAY DRIVER PANEL DEVICE AND METHOD FOR DRIVING SAME

(71) Applicant: SHANGHAI JADIC OPTOELECTRONICS TECHNOLOGY CO., LTD, Shanghai (CN)

(72) Inventor: Xiaochuan Wang, Shanghai (CN)

(73) Assignee: SHANGHAI JADIC OPTOELECTRONICS TECHNOLOGY CO., LTD., Shanghai (CN)

( * ) Notice: Subject to any disclaimer, the term of this patent is extended or adjusted under 35 U.S.C. 154(b) by 40 days.

(21) Appl. No.: 15/877,881

(22) Filed: Jan. 23, 2018

(65) Prior Publication Data

US 2018/0211618 A1 Jul. 26, 2018

(30) Foreign Application Priority Data

Jan. 24, 2017 (CN) .......................... 2017 1 0060096

(51) Int. Cl.
 *G09G 3/36* (2006.01)
 *G06T 11/60* (2006.01)

(52) U.S. Cl.
 CPC ............ *G09G 3/3648* (2013.01); *G06T 11/60* (2013.01); *G09G 2320/0261* (2013.01); *G09G 2360/14* (2013.01)

(58) Field of Classification Search
 None
 See application file for complete search history.

(56) References Cited

U.S. PATENT DOCUMENTS

| 10,109,054 | B1* | 10/2018 | Wilson | G06T 7/97 |
| 2005/0128332 | A1* | 6/2005 | Tsuboi | H04N 5/2253 348/333.12 |
| 2008/0165267 | A1* | 7/2008 | Cok | H04N 7/144 348/333.01 |
| 2012/0242621 | A1* | 9/2012 | Brown | H01L 27/14623 345/175 |
| 2016/0011424 | A1* | 1/2016 | Thurber | G02B 27/64 345/8 |
| 2016/0077343 | A1* | 3/2016 | Scales | F41G 3/165 345/633 |
| 2016/0292850 | A1* | 10/2016 | Perez | G06F 3/005 |
| 2016/0328882 | A1* | 11/2016 | Lee | G06T 19/006 |
| 2018/0113317 | A1* | 4/2018 | DeBates | G06T 19/006 |
| 2018/0113506 | A1* | 4/2018 | Hall | G02B 27/0172 |

* cited by examiner

*Primary Examiner* — Ryan M Gray
(74) *Attorney, Agent, or Firm* — Muncy, Geissler, Olds & Lowe, P.C.

(57) ABSTRACT

A display driver panel device and a method therefor are disclosed. The device includes: an image sensor array consisting of pixel sensor elements arranged in M rows and N columns; and a display driver array consisting of display driver elements arranged in M rows and N columns. Each of the display driver elements corresponds to a respective one of the pixel sensor elements. As such, first display input signals generated by the pixel sensor elements from a received external imaging radiation can be sent to the respective corresponding display driver elements. As a result, the display driver elements respond at the same time, resulting in an increased response speed of the display driver panel device.

21 Claims, 7 Drawing Sheets

DISPLAY DRIVER PANEL DEVICE AND METHOD FOR DRIVING SAME

CROSS-REFERENCES TO RELATED APPLICATIONS

This application claims the priority of Chinese patent application number 2017100600964, filed on Jan. 24, 2017, the entire contents of which are incorporated herein by reference.

TECHNICAL FIELD

The present invention relates to the field of image sensors and, in particular, to a display driver panel device and a method for driving the device.

BACKGROUND

Augmented reality (AR) is a novel technique that seamlessly combines real-world information with virtual-world information. With AR, virtual simulations of tangible information (visual information, sounds, tastes, tactile feelings, etc.) that would be rarely experienced in a certain spatial or temporal range in the real world generated by digital signal processing, computer and other techniques are overlaid on real world and perceived by human senses so as to provide a sensory experience of augmented reality. The virtual objects are overlaid in real time on the same scene or space of a real environment.

It is a core objective of AR to simultaneously and synchronously present real-world information and virtual information in such a manner that the two kinds of information are overlaid and complement each other. In visualized AR, a dedicated display system including a head-mounted seeks to display a real-world scene and multiple computer-generated graphics synthesized therewith to a user's eyes in a synchronized manner so that the user can visually perceive that he/she is just in the real-world environment.

AR involves a variety of new techniques and means for multimedia, three-dimensional modeling, real-time video display and control, multi-sensor integration, real-time tracking and registration, scene fusion, etc. AR provides information different from what human beings can perceive in general.

A complete AR system is implemented by a set of tightly-coupled hardware components operating in a real-time manner as well as an associated software system. Head-mounted displays (HMDs) have a number of outstanding advantages such as portability and visual immersion. Therefore, in addition to their extensive use in virtual reality (VR) systems, they have also been adopted as the display means for AR systems where they are also called see-through HMDs. By how they operate, see-through HMDs are divided into two groups: optical See-through HMDs operating according to optical principles; and video see-through HMD based on video synthesis techniques.

FIG. 1 is a diagram showing the imaging principle of a video see-through HMD based on video synthesis techniques. As shown in the figure, a real-world image 1 captured by a camera 2 is combined with a virtual image generated by a computer graphics system, and the combined image is output to a display screen 3 of the video see-through HMD. However, this portable AR system is associated with some fundamental drawbacks, one of which is that there is an inevitable time delay between the real-world image 1 captured by the camera 2 and the image displayed on the HMD display screen 3, which constitute one of the causes of a viewer's vertigo. As shown in FIG. 1, a digitized image signal T0 displayed on the display screen 3 and seen by the user's eyes 4 is delayed by one or even more frames from the digitized image signal Tn of the real-world image 1 captured by the camera 2 for capturing dynamic scenes. In other words, the image T0 on the display screen 3 seen by the user's eyes 4 is the image of a dynamic real-world scene captured by the camera 2 a while ago, and it is impossible for image signal T0 and image signal Tn to be synchronized.

SUMMARY OF THE INVENTION

It is an objective of the present invention to address the issue of slow display driver array response arising from the use of conventional display driver panel devices by presenting a display driver panel device and a method for driving it.

It is another objective of the present invention to provide a display apparatus and an optical modulation apparatus, each incorporating the display apparatus.

It is a further objective of the present invention to provide a system for displaying mixed reality content, which may incorporate either the display apparatus or the optical modulation apparatus.

In a display driver panel device according to the present invention, an image sensor array consisting of pixel sensor elements arranged in M rows and N columns corresponds to a display driver array consisting of display driver elements arranged in M rows and N columns so that each of the pixel sensor elements corresponds to a respective one of the display driver elements. In this way, each of first display input signals generated by the image sensor elements from a received external imaging radiation can be sent to a corresponding one of the display driver elements. As a result, the display driver elements in the display driver array can respond in an almost synchronized manner, effectively mitigating the slow response problem arising from row-wise scanning and input of external display driver signals to the display driver elements and hence allowing faster array imaging.

Furthermore, in a display system incorporating the display driver panel device as defined above, optical modulation elements or photoelectric display elements for receiving the display driver signals sent from the display driver elements are also arranged in an array so that they correspond to the display driver elements in a one-to-one manner. As such, the display system allows almost synchronized array imaging and array display with a significantly reduced time delay therebetween.

DETAILED DESCRIPTION

The core concept of the present invention to provide a display driver panel device with considerably faster response by transmitting first display input signals using a display driver array that corresponds to an image sensor array in such a manner that each of display driver elements in the display driver array corresponds to a respective one of pixel sensor elements in the image sensor array. In addition, in a display system incorporating the display driver panel device, array imaging and array display are conducted in an almost synchronized way with a considerably reduced time delay therebetween.

To this end, the present invention provides a display driver panel device including a substrate having a first surface and a second surface that is parallel to and faces away from the first surface. Specifically, it includes:

an image sensor array consisting of pixel sensor elements arranged in M rows and N columns; and a display driver array consisting of display driver elements arranged in M rows and N columns.

The image sensor array and the display driver array are both disposed in the substrate, and the display driver elements correspond to the respective pixel sensor elements.

The pixel sensor elements receive an external imaging radiation via the first surface and send first display input signals to the respective corresponding display driver elements. The display driver elements are configured to receive the first display input signals and send display driver signals out via the second surface.

Display apparatuses and projection devices proposed in the present invention will be described in detail below with reference to the accompanying drawings and particular embodiments. The features and advantages of the invention will be more apparent from the following detailed description, as well as from the appended claims. It is noted that the accompanying drawings are provided in a very simplified form not necessarily presented to scale, with the only purpose of facilitating convenience and clarity in explaining the embodiments.

Embodiment 1

Figure 1:
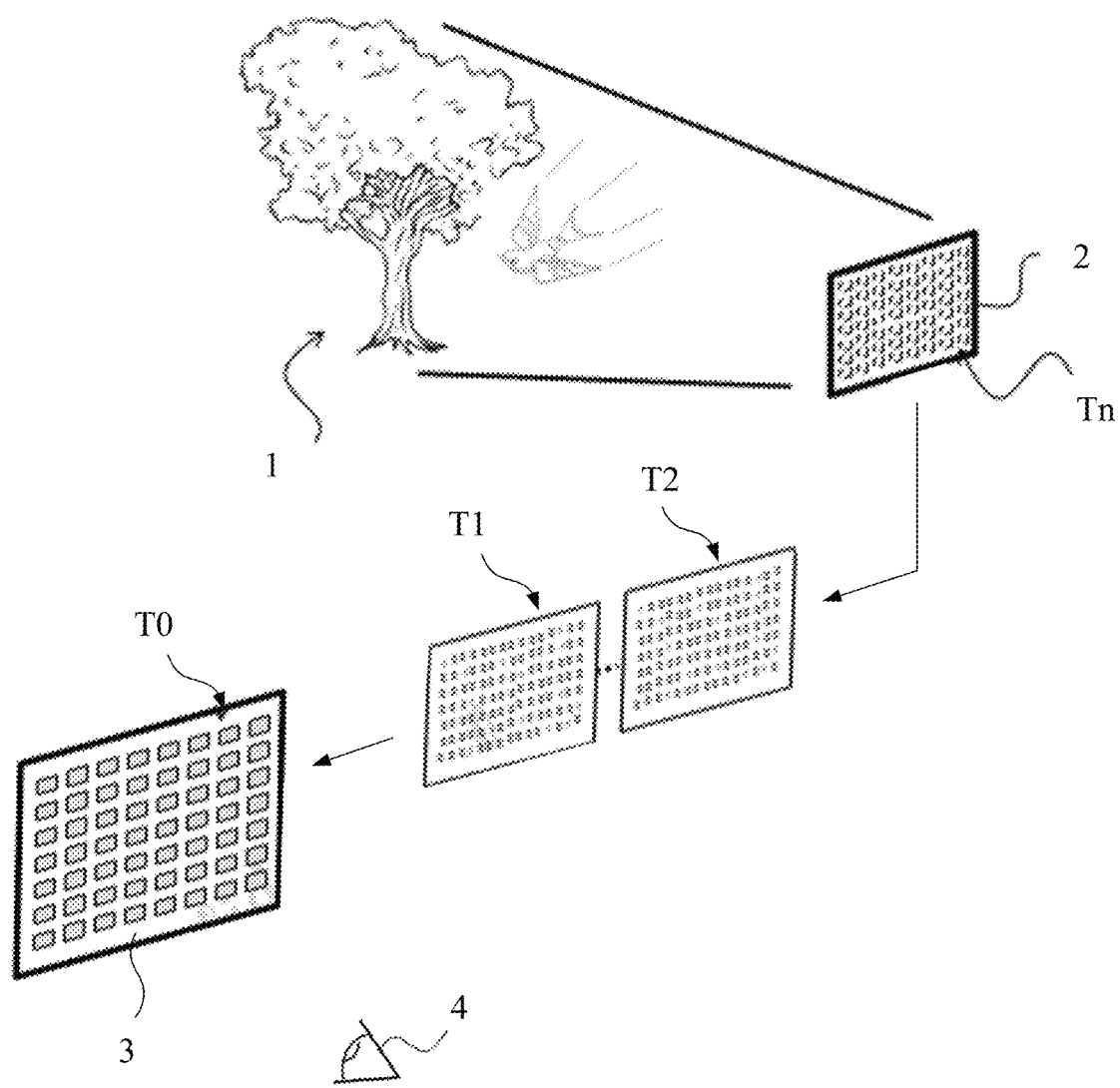
FIG. 1 is a diagram showing the imaging principle of a video see-through HMD.
Figure 2:
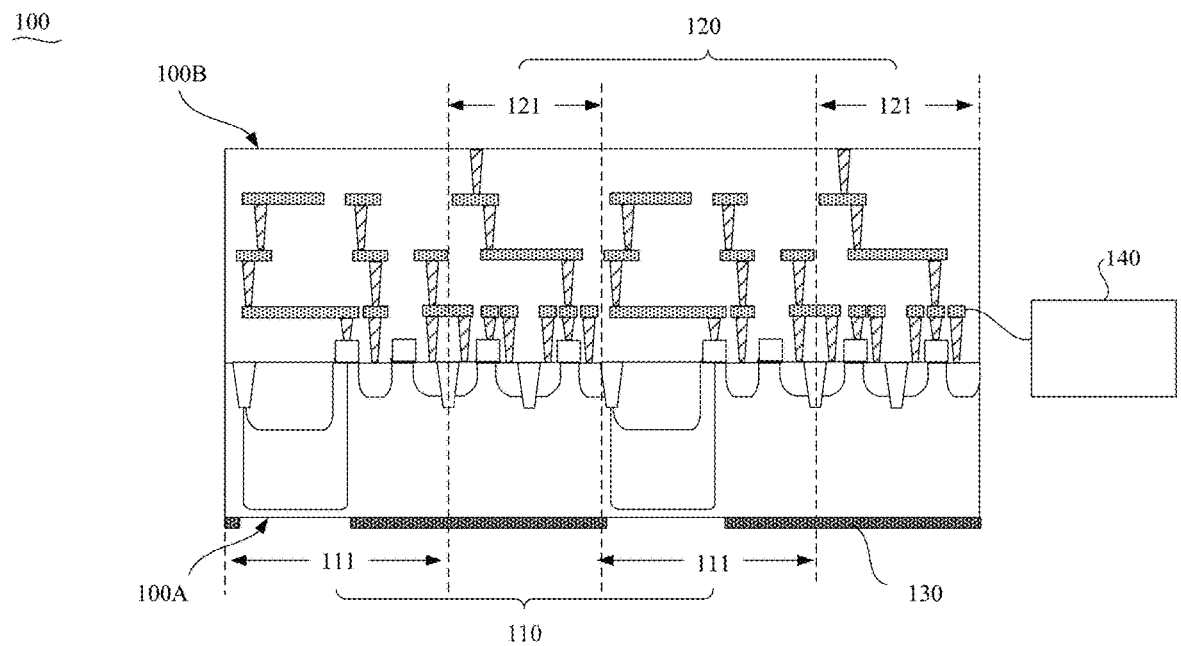
FIG. 2 is a structural schematic of a display driver panel device according to a first embodiment of the present invention.

FIG. 2 is a structural schematic of a display driver panel device according to Embodiment 1 of the present invention.

As shown in the figure, the display driver panel device 100 includes a substrate having a first surface 100A and a second surface 100B that is parallel to and faces away from the first surface 100A. Specifically, the display driver panel device 100 further includes:

an image sensor array 110 consisting of pixel sensor elements 111 arranged in M rows and N columns; and a display driver array 120 consisting of display driver elements 121 arranged in M rows and N columns, wherein M is an integer, and N is an integer.

Additionally, the image sensor array 110 and the display driver array 120 are both disposed in the substrate, and the display driver elements 121 are electrically connected to the respective corresponding pixel sensor elements 111.

Figure 3:
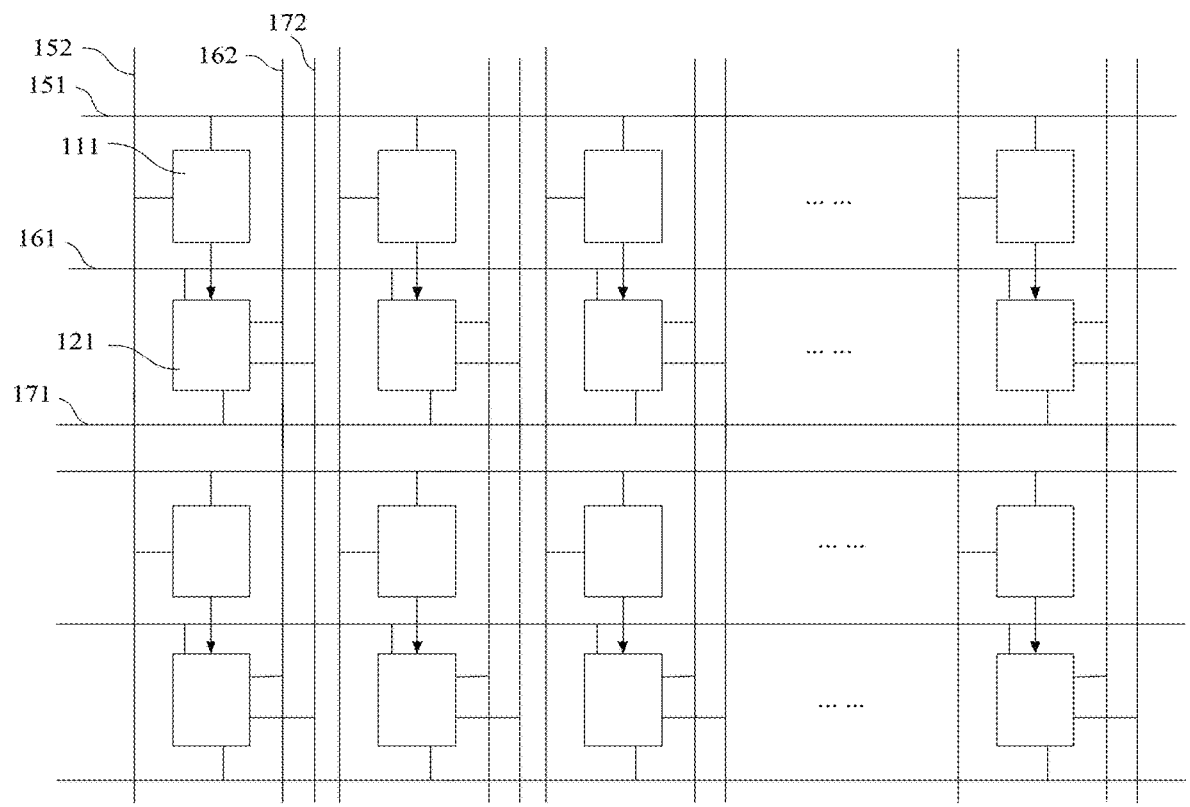
FIG. 3 is a circuit schematic of the display driver panel device according to the first embodiment of the present invention.

FIG. 3 shows a circuit schematic of the display driver panel device according to Embodiment 1 of the present invention. With combined reference to FIGS. 2 and 3, the display driver panel device according to this embodiment further includes an image sensor control line group and a first display driver control line group. Specifically, the image sensor control line group includes M row lines 151 and N column lines 152 crossing the row lines at right angles. The first display driver control line group includes M row lines 161 and N column lines 162 crossing the row lines at right angles.

The image sensor control line group and the first display driver control line group are both configured in the substrate such that each pixel sensor element 111 in the image sensor array 110 is electrically connected to a corresponding pair of the lines in the image sensor control line group and that each display driver element 121 in the display driver array 120 is electrically connected to a corresponding pair of the lines in the first display driver control line group. That is, the image sensor control line group is used for gating and control of the pixel sensor elements 111 in the image sensor array 110, and the first display driver control line group is used for gating and control of the display driver elements 121 in the display driver array 120.

With continued reference to FIG. 2, in this embodiment, the pixel sensor elements 111 in the image sensor array 110 and the display driver elements 121 in the display driver array 120 are disposed in the same plane and are spaced apart from one another, or in other words, the pixel sensor elements in the image sensor array and the display driver elements in the display driver array are alternately arranged in the same plane. The pixel sensor elements 111 can receive an external imaging radiation via the first surface 100A, and the pixel sensor elements 111 can convert optical signals into electrical signals, thereby forming first display input signals. Further, the pixel sensor elements 111 send the first display input signals to the respective corresponding display driver elements 121 so that the display driver elements 121 can respond more rapidly to generate display driver signals and send the display driver signals out via the second surface 100B.

Additionally, the display driver panel device 100 further includes a light blocking plate 130 that is disposed on the first surface 100A of the substrate. The light blocking plate 130 shades the display driver elements 120 and exposes the pixel sensor elements 110. As such, during the reception of external imaging radiations by the display driver panel device 100, optical signals of the external imaging radiation act only on the pixel sensor elements 110 but have no impact on the display driver elements 120.

In this embodiment, the pixel sensor elements 111 include respective light sensing components which are disposed in the vicinity of the first surface 100A and configured to receive the external imaging radiation and to convert optical signals of the external imaging radiation into electrical signals. That is, in this embodiment, the light sensing components are exposed from the light blocking plate 130. Specifically, the light sensing components may be implemented as photodiodes. Each of the photodiodes may either be a stack of a P-doped layer and an N-doped layer or a stack of a P-doped layer, an I-layer and an N-doped layer. In addition, materials from which the photodiodes are fabricated may include, for example, silicon, germanium, silicon carbide, gallium arsenide, or any other material that can be used to fabricate photodiodes. Further, the pixel sensor elements 111 also include pixel sensor circuits which are connected to the light sensing components and are configured to modulate, amplify and output the electrical signals generated by the light sensing components.

Further, the display driver elements 121 include respective pixel display driver circuits which receive the first display input signals. Signal transmission is enabled by electrical connections between the pixel display driver circuits and the pixel sensor elements 111 in the image sensor array 110. In this embodiment, the electrical connections between the pixel display driver circuits and the pixel sensor elements 111 can be accomplished by arranging them in the same semiconductor layer. To this end, the substrate may include a first semiconductor layer in which the pixel display driver circuits and the pixel sensor elements 111 are arranged. Specifically, the first semiconductor layer may be configured in a chip.

In this embodiment, the pixel display driver circuits may also be configured to send display driver signals generated by the pixel display driver circuits. Therefore, directly electrically connecting the pixel display driver circuits to the driven elements allows transmission of the display driver signals to the driven elements. Additionally, in other embodiments, the display driver signals may alternatively be controlled and transmitted via a first macro driver/control electrical line group (not shown) consisting of M row lines and N column lines. The first macro driver/control electrical line group is electrically connected between the display driver elements and the driven elements. Specifically, the pixel display driver circuits receive the first display input signals and pass the first display input signals on to the first macro driver/control electrical line group which, in turn, converts the first display input signals into the display driver signals and sends the display driver signals out.

In this embodiment, the external optical signals are converted to the electrical signals by the light sensing components in the pixel sensor elements 111 and input to the display driver elements 121. In other embodiments, the pixel sensor elements 111 may alternatively include heat sensing components which face toward the first surface 100A to receive an external thermal imaging radiation via the first surface and convert thermal signals of the external thermal imaging radiation into electrical signals. Specifically, the heat sensing components are, for example, radiant-heat sensing components. In other embodiments, the pixel sensor element 111 may alternatively include respective X-ray sensing components. That is, depending on the practical need, different pixel sensor elements may be used to obtain electrical signals from a corresponding image. The pixel sensor elements may include one or more of the light sensing components, heat sensing components and X-ray radiation sensing components.

Preferably, the display driver panel device 100 further includes a second macro driver/control electrical line group (not shown) consisting of M row lines and N column lines, under the control of which, the first display input signals are sent from the pixel sensor elements 111 to the display driver elements 121. The first display input signals are, for example, electrical signals for a first image generated from the external imaging radiation by the pixel sensor element 110.

Moreover, the display driver panel device may further include a virtual display signal unit 140 in electrical connection with the display driver array 120. The virtual display signal unit 140 is configured to send second display input signals to the display driver array 120 so that the display driver elements 121 can generate the display driver signals based on the first and second display input signals. That is, the display driver element 121 can receive multiple sets of display input signals and generate and output corresponding display driver signals based on the received display input signals.

Specifically, referring to FIGS. 2 and 3, in this embodiment, the display driver panel device may further include a second display driver control line group consisting of M row lines 171 and N column lines 172 crossing the row lines at right angles. The second display driver control line group is disposed in the substrate and each of the display driver elements 121 in the display driver array 120 is electrically connected to a corresponding pair of the lines of the second display driver control line group, allowing the second display input signals to be input to the display driver elements. That is, the second display driver control line group may be connected between the virtual display signal unit 140 and the display driver array 120 so that each of the second display input signals can be sent to a corresponding one of the display driver elements 121 via a corresponding pair of the lines in the second display driver control line group. The second display input signals are, for example, electrical signals of a second image.

In an alternative embodiment, a color filter layer (not shown in FIGS. 2 and 3) may be further formed on the side of each light sensing component opposing the side thereof proximal to the pixel sensor circuit. The color filter layer allows the image sensor array 110 to sense light of different colors. Furthermore, the color filter layer may be provided with a micro-lens array (not shown) for facilitating the photodiode's convergence and absorption of incident light.

In accordance with the display driver panel devices discussed above, the present invention further provides a method for driving a display driver panel device. With reference to FIGS. 2 and 3, the method includes the steps as detailed below.

At first, a display driver panel device 100 as defined above is provided, which has a first surface 100A and a second surface 100B that is parallel to and faces away from the first surface 100A. An image sensor array 110 and a display driver array 120 are disposed between the first surface 100A and the second surface 100B, and display driver elements 121 in the display driver array 120 are electrically connected to respective corresponding pixel sensor elements 111 in the image sensor array 110.

Subsequently, the pixel sensor elements 111 in the image sensor array 110 receive an external imaging radiation via the first surface 100A and send first display input signals to the respective corresponding display driver elements 121.

The display driver elements 121 then receive the respective first display input signals and generate display driver signals.

After that, the display driver signals are sent out via the second surface 100B.

In the course of driving the display driver panel device according to the present invention, the pixel sensor elements can simultaneously send the first display input signals to the respective corresponding display driver elements so that each of the display driver elements can be simultaneously gated to generate a display driver signal. This enables synchronous driving and accelerates response of the display driver panel device.

Embodiment 2

This embodiment differs from Embodiment 1 in that the image sensor array is arranged in parallel to the display driver array so that the pixel sensor elements and the display driver elements are arranged in two parallel planes and interconnected in a one-to-one manner.

Figure 4:
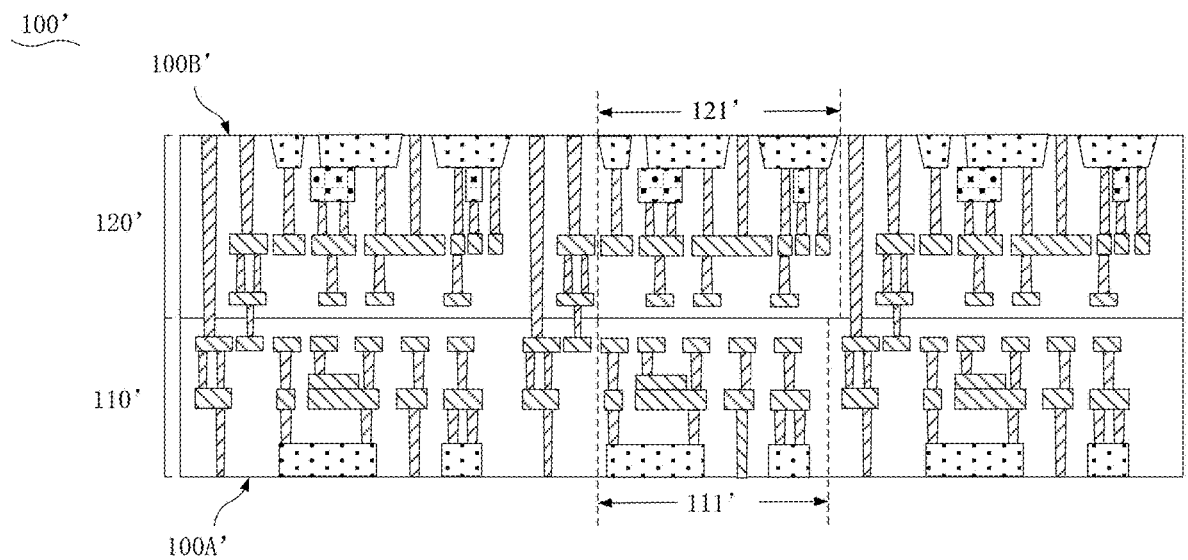
FIG. 4 is a structural schematic of a display driver panel device according to a second embodiment of the present invention.

FIG. 4 is a structural schematic of a display driver panel device according to Embodiment 2 of the present invention. As shown in FIG. 4, the display driver panel device 100' includes:

an image sensor array 110' consisting of pixel sensor elements 111' arranged in M rows and N columns, wherein the image sensor array 110' is disposed in a substrate in a parallel manner and is proximal to a first surface 100A' of the substrate; and a display driver array 120' consisting of display driver elements 121' arranged in M rows and N columns, wherein the display driver array 120' is disposed in the substrate in a parallel manner and is proximal to a second surface 100B' of the substrate.

Similarly to Embodiment 1, the display driver elements 121' according to this embodiment may also include respective pixel display driver circuits which may also be electrically connected to the respective pixel sensor elements 111' to receive first display input signals. Their electrical connections may be accomplished either by forming the pixel display driver circuits and the pixel sensor elements in the same semiconductor layer or by forming them in different semiconductor layers and connecting them with conductive plugs.

Specifically, the substrate may include a first semiconductor layer and a second semiconductor layer arranged parallel to the first semiconductor layer. The first semiconductor layer is located near the first surface 100A', while the second semiconductor layer is proximal to the second surface 100B'. The pixel sensor elements 111' are arranged in the first semiconductor layer, and the pixel display driver circuits can be configured in the second semiconductor layer. That is, the display driver panel device constituted by the first and second semiconductor layers is a stack structure.

Further, the first and second semiconductor layers may be disposed in the same chip. To this end, the pixel sensor element 111' and the pixel display driver circuits may be sequentially fabricated in a same chip, followed by electrically connecting them with connecting components. It is a matter of course that the first and second semiconductor layers may also be disposed in two separate chips which are bonded together so that the pixel sensor elements 111' in the first semiconductor layer are electrically connected to the pixel display driver circuits in the second semiconductor layers. Wherein both the first and second semiconductor layers may be mono-crystalline silicon or other materials commonly used in the art.

It is a matter of course that, in other embodiments, the image sensor array 110 and the pixel display driver circuits may be both formed in the first semiconductor layer. In this case, the substrate can include only the first semiconductor layer.

Embodiment 3

The display driver panel devices according to the present invention can each be incorporated in a display apparatus. This embodiment is described in detail in context of the display driver panel device 100 according to Embodiment 1 as an example.

Figure 5:
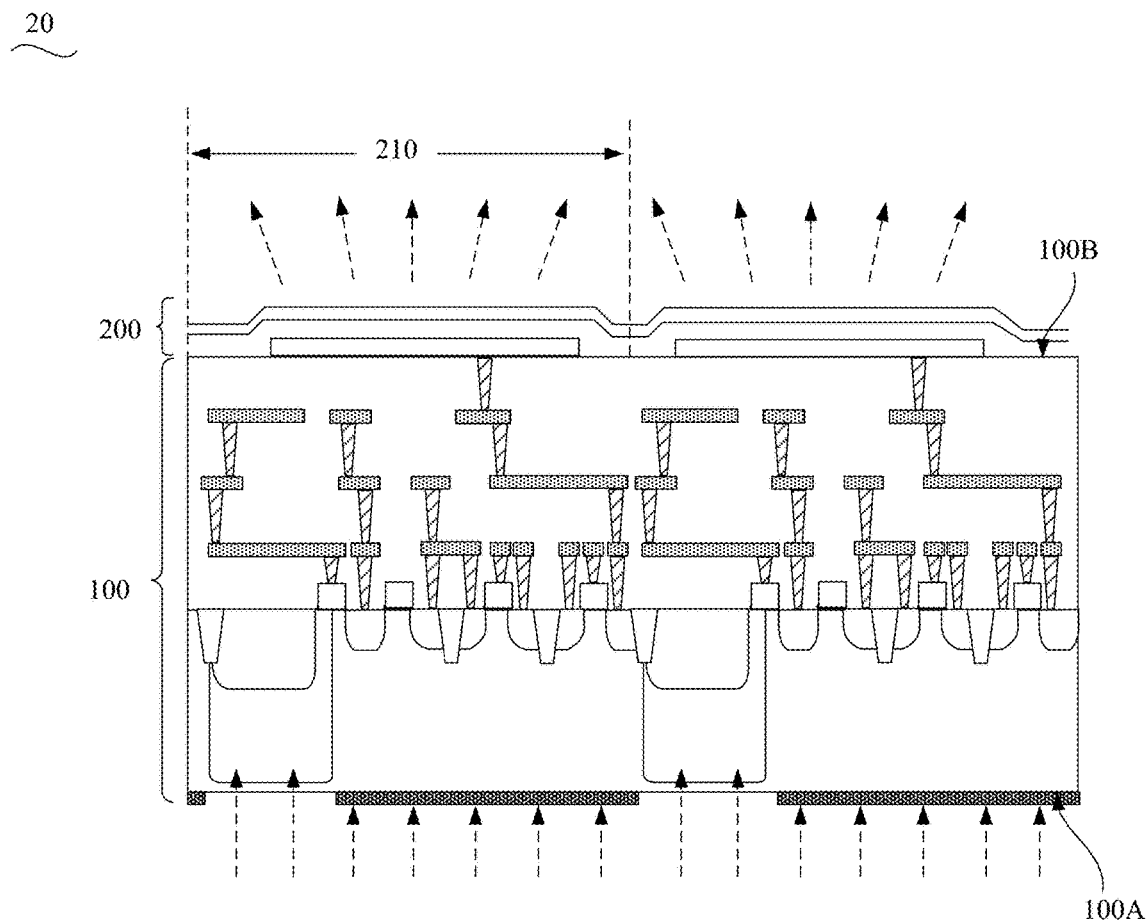
FIG. 5 is a structural schematic of a display apparatus according to a third embodiment of the present invention.
Figure 6:
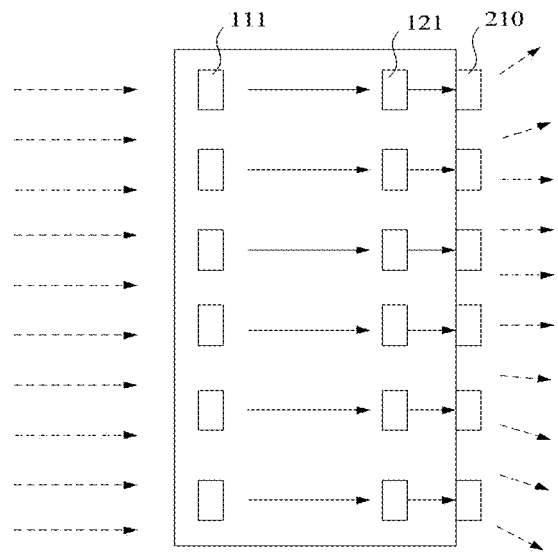
FIG. 6 schematically shows how the display apparatus according to the third embodiment of the present invention works.

FIG. 5 is a structural schematic of a display apparatus according to Embodiment 3 of the present invention, and FIG. 6 schematically shows how the display apparatus according to Embodiment 3 of the present invention works. With combined reference to FIGS. 5 and 6, the display apparatus 20 includes the above-described display driver panel device 100 and an array display 200. The display driver panel device 100 includes a substrate having a first surface 100A and a second surface 100B. Reference can be made to the description of Embodiment 1 for structural details of the display driver panel device 100, and further description in this regard is not necessary. The array display 200 is disposed on the second surface 100B of the substrate in order to receive display driver signals sent from the display driver panel device 100 to accomplish its display function.

With combined reference to FIGS. 2 and 5, the array display 200 includes photoelectric display elements 210 arranged in M rows and N columns. The photoelectric display elements 210 correspond to respective display driver elements 121. As such, the display driver elements 121 can send respective display driver signals to the respective photoelectric display elements 210 via the second surface 100B.

The photoelectric display elements 210 may be light-emitting elements which emit light under the control of the respective display driver elements 121. The light-emitting elements may be semiconductor light-emitting diodes (LEDs). The semiconductor LEDs may be organic LEDs (OLEDs). It is a matter of course that the semiconductor light-emitting diodes may also be inorganic LEDs such as, for example, those producing blue primary color light based on gallium nitride, or those producing red light based on gallium arsenide, or those producing green primary color light based on gallium phosphide, or their combinations. In this embodiment, the display apparatus 20 can display an image by means of spontaneous light emission of the photoelectric display elements 210 under the effect of the active display driver signals that they receive.

In this embodiment, the display driver signals may be generated only based on first display input signals. The generation is described in further detail below.

Firstly, light from an image passes via the first surface 100A and is then incident on the pixel sensor elements 111.

Following that, the pixel sensor elements 111 receive the optical signals and convert the optical signals into electrical signals as the first display input signals. Additionally, the pixel sensor elements 111 send the respective first display input signals to the respective corresponding display driver elements 121.

Afterward, the display driver elements 121 generate display driver signals based on the received first display input signals and send the display driver signals to the photoelectric display elements 210 via the second surface 100B.

The photoelectric display elements 210 then generate corresponding light under the effect of the received signals, i.e., displaying the image.

However, as described above in connection to Embodiment 1, the display driver signals may also be generated based on multiple sets of display input signals. To this end, the display driver array 120 in the display driver panel device 100 may be configured to receive multiple sets of display input signals and generate corresponding display driver signals based on the multiple sets of display input signals. Specifically, the image sensor array 110 in the display driver panel device 100 may generate, based on an external imaging radiation, the first display input signals which are received by the display driver array 120. The first display input signals may be electrical signals for a first image corresponding to the external imaging radiation. The display driver array 120 may further be configured to receive second display input signals. With combined reference to FIGS. 2 and 4, the display driver panel device 100 may further include a virtual display signal unit 140 electrically connected to the display driver array 120. The virtual display signal unit 140 may be configured to provide the second display input signals and send the second display input signals to the display driver array 120. The second display input signals may be electrical signals for a second image. In this way, the display driver array 120 may generate the display driver signals based on both the first image electrical signals and the second image electrical signals and send the generated signals to the array display 200 so that an image resulting from the overlaying of the first and second images is displayed by the display apparatus 20.

As the display apparatus employs the above-described display driver panel device that has a higher responding speed, the photoelectric display elements in the array display are driven at a higher speed. Moreover, since the photoelectric display elements correspond to display driver elements in the display driver panel device in a one-to-one manner, they are simultaneously driven, allowing synchronized array display.

Embodiment 4

The present invention also provides a display system incorporating the display apparatus as defined above. The display system may be configured to display mixed reality content. The display system may either be a virtual reality (VR) display system or an augmented reality (AR) display system. This embodiment is described with the display system serving as an AR display system as an example.

Figure 7:
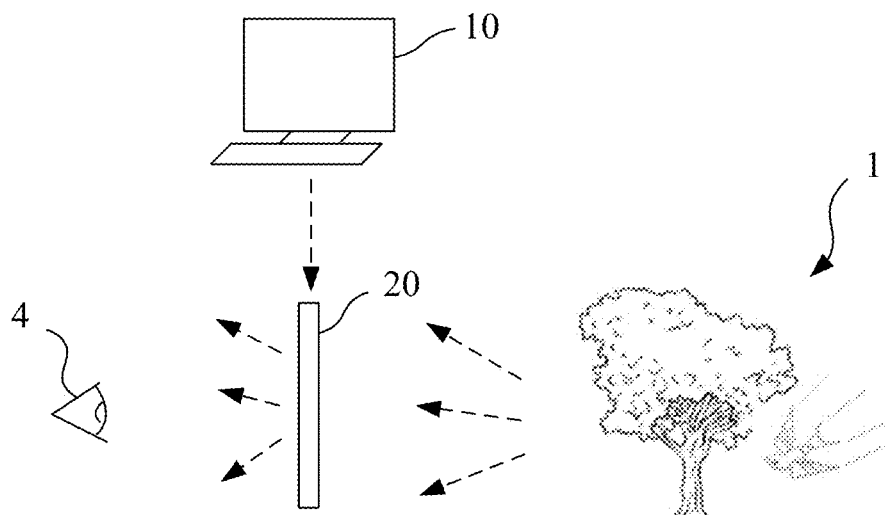
FIG. 7 is a structural schematic of a system for displaying mixed reality content according to a fourth embodiment of the present invention.

FIG. 7 is a structural schematic of the system for displaying mixed reality content according to Embodiment 4 of the present invention. As shown in FIG. 7, the system includes the above-discussed display apparatus 20 that includes a display driver panel device and an array display. Reference can be made to the description of Embodiment 2 for structural details of the display apparatus, and further description in this regard is not necessary. It can be configured to display virtual images resulting from overlaid virtual and real images.

With combined reference to FIGS. 2 to 7, the virtual display signal unit 140 in the display driver panel device 100 is configured to provide electrical signals for a virtual image and send the electrical signals for the virtual image to the display driver array 120 in the display driver panel device 100. Additionally, the image sensor array 110 in the display driver panel device 100 may generate electrical signals for a real image 1 based on light therefrom. The electrical signals for the virtual image and the electrical signals for the real image are simultaneously sent to the display driver array 120, based on which, the display driver array 120 can generate corresponding display driver signals for driving the display apparatus 20 to display the resulting virtual image.

As can be understood from above, the display apparatus in the AR display system according to this embodiment control the operation of the display driver array based on both the electrical signals for the virtual image and the electrical signals for the real image. As a result, the virtual and real images are output or overlaid in a synchronized manner without a time delay.

In the proposed system for displaying mixed reality content, the real image is displayed on the display apparatus at the same time when it is obtained, without a time delay. Therefore, the virtual image is better matched with the real image. Although the systems for displaying mixed reality content according to Embodiments 4 and 5 are described as being AR display systems, those skilled in the art will appreciate that the systems may also be VR display systems. In this case, images on their display screens can be directly displayed by the display apparatuses.

Embodiment 5

The proposed display driver panel device may also be used in an optical modulation apparatus. In this embodiment, an optical modulation apparatus incorporates a display driver panel device as defined above, which may either be the display driver panel device according to Embodiment 1 or that of Embodiment 2. This embodiment is described in context of the display driver panel device according to Embodiment 2 as an example.

Figure 8:
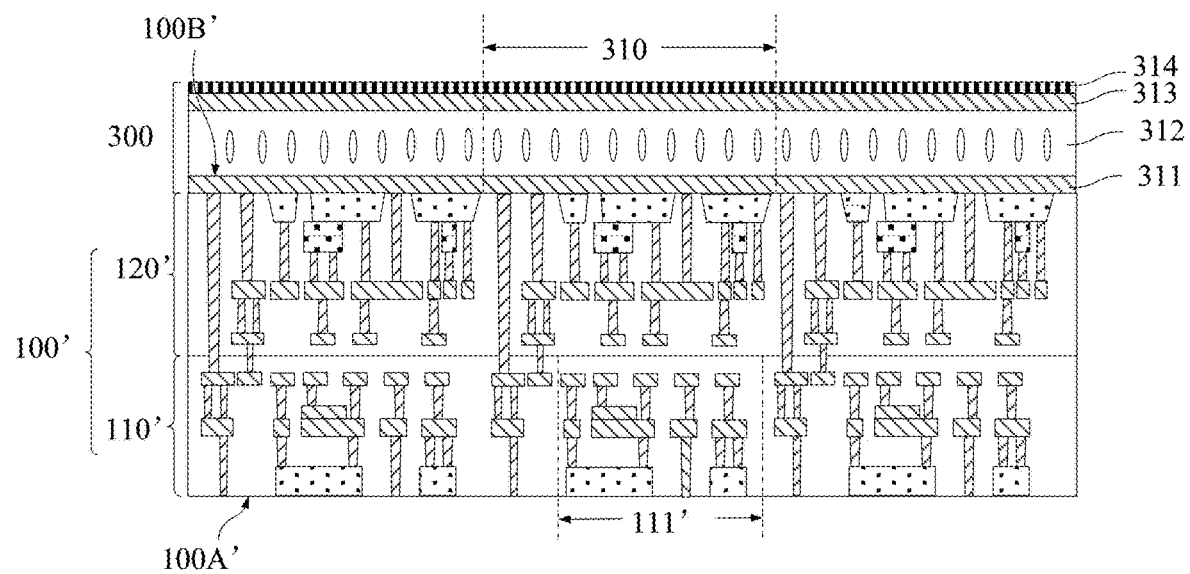
FIG. 8 is a structural schematic of an optical modulation apparatus according to a fifth embodiment of the present invention.

FIG. 8 is a structural schematic of the optical modulation apparatus according to Embodiment 5 of the present invention. As shown in the figure, the optical modulation apparatus includes the display driver panel device 100' and an optical modulation array 300. The display driver panel device 100' outputs signals to the optical modulation array 300 via the second surface 100B' so as to drive the optical modulation array 300 to perform optical modulation. It is to be understood that, in this embodiment, the display driver signals output from the display driver panel device 100' are display modulation signals.

With combined reference to FIGS. 4 and 8, the optical modulation array 300 includes optical modulation elements 310 arranged in M rows and N columns on the second surface 100B'. The optical modulation elements 310 are electrically connected to the respective corresponding display driver element 121' in the display driver panel device 100' and configured to receive display modulation signals via the second surface 100B'.

In this embodiment, the optical modulation elements may be liquid crystal shutters. Specifically, as shown in FIG. 8, each of the liquid crystal shutters includes a first transparent electrode 311 on the display driver array 120', a second transparent electrode 313 and a liquid crystal layer 312 between the first transparent electrode 311 and the second transparent electrode 313. The first transparent electrodes 311 are connected to the display driver elements 121', whilst the second transparent electrode 313 may be connected to an external common electrode. Voltages between the first transparent electrodes 311 and the second transparent electrodes 313 may be controlled so that the orientation of liquid crystals in the liquid crystal layer 312 is changed so that the liquid crystal shutters are opened or closed.

Further, each optical modulation element 310 is provided with a color filter layer 314 formed on the second transparent electrode 313, with which light of different colors can be recognized. In addition, a micro-lens array (not shown) can be provided on the color filter layer 314 to converge and send out light modulated by the optical modulation elements 310.

Likewise, in this optical modulation apparatus, the display driver array 120' may also be able to generate display driver signals based on multiple sets of display input signals. To this end, in this embodiment, the display driver panel device may also include a virtual display signal unit electrically connected to the display driver array 120' in the display driver panel device in order to provide second display input signals and send the second display input signals to the display driver array 120'. The image sensor array 110' in the display driver panel device 100' may provide first display input signals and send the first display input signals to the display driver array. As such, the display driver array 110' may generate the display driver signals from the first and second display input signals, which drive the optical modulation array 300 to perform light modulation. Similar to Embodiment 3, the first display input signals may be electrical signals for a first image, and the second display input signals may be electrical signals for a second image.

Embodiment 6

In this embodiment, another optical modulation apparatus incorporating the display driver panel device as defined above is provided. Differing from Embodiment 5, the optical modulation elements in this embodiment are MEMS optical modulators. The MEMS optical modulators may be transmissive optical modulators, reflective optical modulators or diffractive optical modulators.

Figure 9:
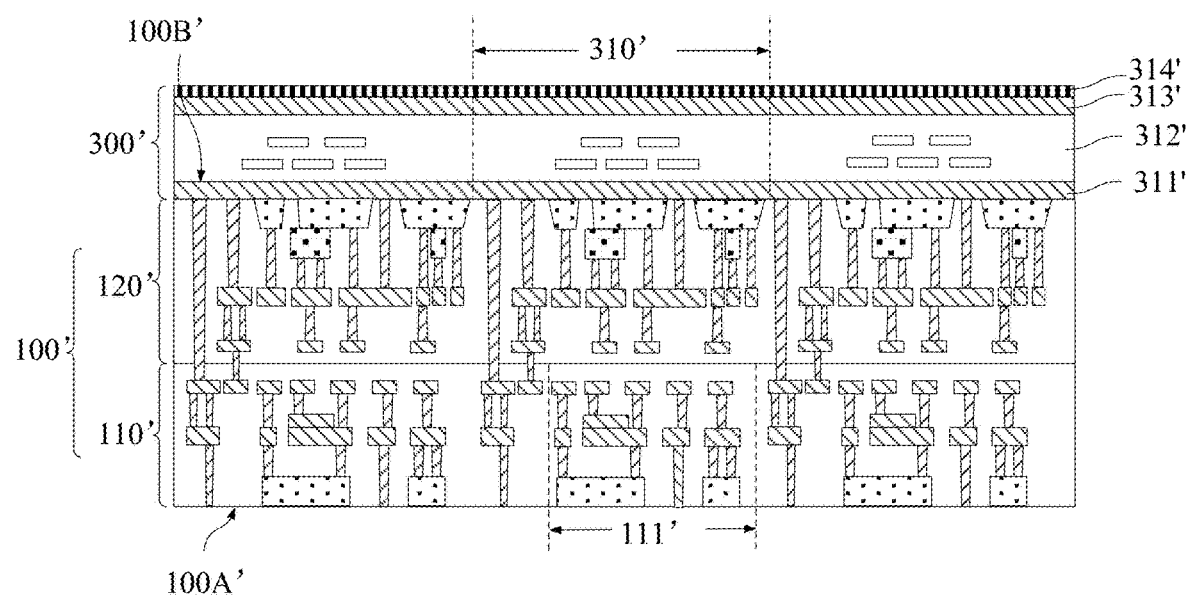
FIG. 9 is a structural schematic of an optical modulation apparatus according to a sixth embodiment of the present invention.

The following description is made with transmissive optical modulators as an example. FIG. 9 is a structural schematic of the optical modulation apparatus according to Embodiment 6 of the present invention. Referring to FIG. 9, the MEMS optical modulators 300' includes a fixed grating array 311', a MEMS transmissive grating array 312' and a transparent cap layer 313'. The fixed grating array 311' is located on the side of the second surface 100B' facing away from the first surface 100A'. The MEMS transmissive grating array 312' is situated on the fixed grating array 311' and includes a plurality of MEMS transmissive shutters. The transparent cap layer 313' is provided on the transmissive MEMS grating array 312' in order to protect the MEMS transmissive grating array 312' from external air and impurities.

In addition, the fixed grating array 311' is electrically connected to the display driver elements 121'. That is, in this embodiment, the MEMS optical modulators 300' receive display modulation signals from the respective corresponding display driver element 121' via the second surface 100B. Under the control of the display modulation signals, each of the MEMS transmissive shutters is opened or closed, enabling light modulation.

As the optical modulation apparatus employs the above-described display driver panel device that has a higher responding speed, the optical modulation array is driven at a higher speed. Moreover, as the optical modulation elements in the optical modulation array simultaneously receive the respective display modulation signals, they are driven in a synchronized manner. Therefore, when the optical modulation apparatus is applied to a display system, for example, a system for displaying mixed reality content, synchronized array imaging and array display can further be attained.

Embodiment 7

The proposed optical modulation apparatus as defined above can be incorporated in a system for displaying mixed reality content. In this embodiment, the system for displaying mixed reality content is a VR display system.

Figure 10:
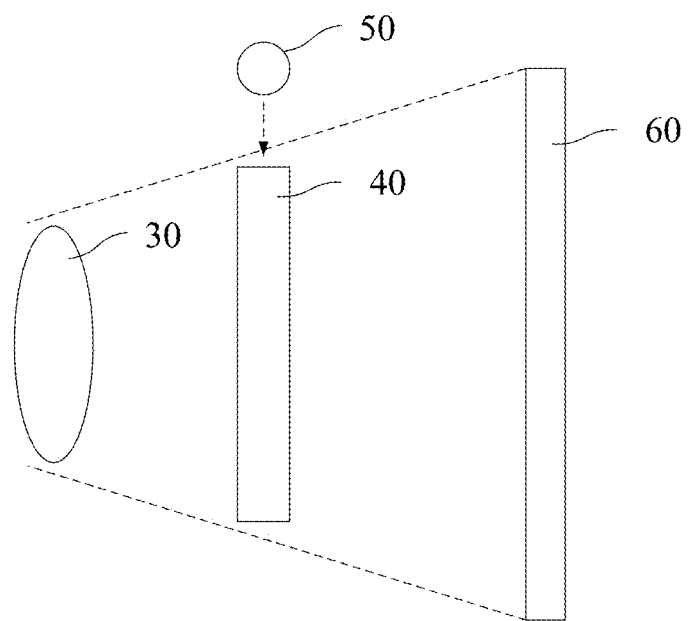
FIG. 10 is a structural schematic of a system for displaying mixed reality content according to a seventh embodiment of the present invention.

FIG. 10 is a structural schematic of the system for displaying mixed reality content according to Embodiment 7 of the present invention. The VR display system includes the optical modulation apparatus. Specifically, as shown in FIG. 10, the VR display system includes: a display screen 30, the optical modulation apparatus 40, a light source 50 and an optical lens 60. The display screen 30 is located on the side of the optical modulation apparatus 40 adjacent to its image sensor array and is configured to display a virtual image. In particular, the display screen 30 may be a thin film transistor liquid crystal display (TFT-LCD) screen. The optical modulation apparatus 40 is disposed between the display screen 30 and the optical lens 60 and is configured to selectively block the passage of light. As described above, the optical modulation elements in the optical modulation apparatus 40 may be liquid crystal shutters or MEMS optical modulators. The light source 50 is adapted to provide light that is incident on the optical modulation apparatus 40. The light is then modulated by the optical modulation apparatus 40 and sent therefrom. The optical lens 60 is configured to amplify the light from an image that has passed through the optical modulation apparatus 40 so that the user can see the enlarged optical image.

Figure 11:
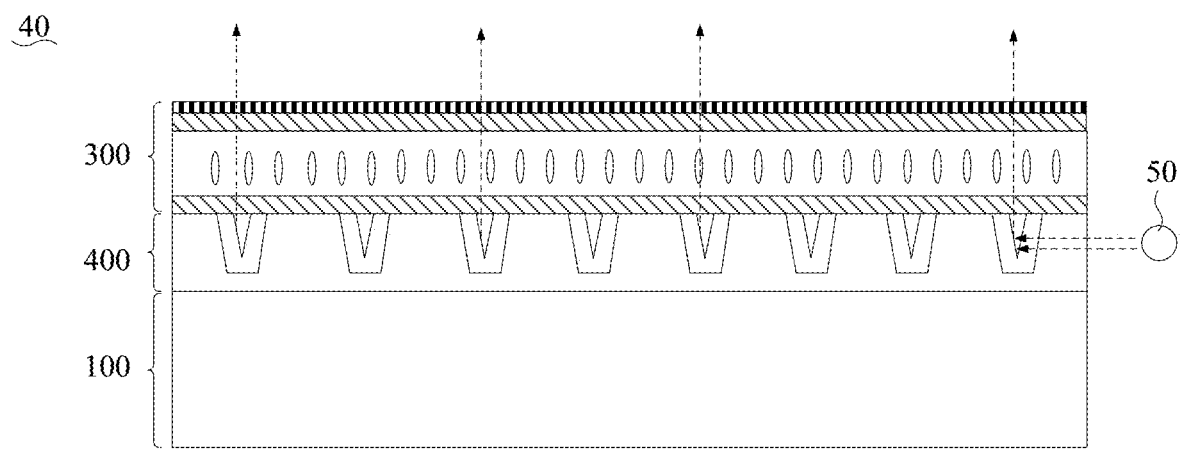
FIG. 11 is a structural schematic of an optical modulation apparatus in the system for displaying mixed reality content according to a seventh embodiment of the present invention.

In addition, the light source 50 is located beside the optical modulation apparatus 40 so that the light emanated from the light source 50 is laterally incident on the optical modulation apparatus 40. Moreover, in this embodiment, the optical modulation apparatus 40 may be further provided with a planar light guide plate, with which the light is so deflected as to exit the optical modulation array at right angles. Specifically, reference can be made to FIG. 11 for structural details of the optical modulation apparatus in this embodiment. The optical modulation apparatus 40 includes: an optical modulation array 300, a display driver panel device 100 for driving the optical modulation array 300, and the planar light guide plate 400. Reference can be made to the foregoing embodiments for structural details of the display driver panel device 100 and the optical modulation array 300, and further description in this regard is not necessary. The planar light guide plate 400 is provided between the display driver panel device 100 and the optical modulation array 300 and is configured to deflect the lateral incident light so that the deflected light enters the optical modulation array 300.

In this embodiment, the VR display system operates in a way as detailed blow.

First, the display screen 30 provides a virtual image so that and light from the image is incident on the optical modulation apparatus 40.

Subsequently, the image sensor array in the optical modulation apparatus 40 generates first display input signals based on the image and transmits the first display input signals to the display driver array. From the first display input signals, the display driver array generates display modulation signals and sends the display modulation signals to the optical modulation array 300, under the effect of which, the corresponding optical modulation elements are individually opened or closed.

Meanwhile, light from the light source 50 is laterally incident on the planar light guide plate 400 and is deflected thereby toward the optical modulation array 300. At this point, if the optical modulation elements in the optical modulation array 300 are opened, the light will pass through the optical modulation array 300. Otherwise, the light is blocked.

The light exiting the optical modulation apparatus 40 is incident on the optical lens 60 and amplified thereby so that the user can see the enlarged image on the display screen.

Embodiment 8

In this embodiment, an AR display system for displaying mixed reality content is provided, which incorporates the optical modulation apparatus as defined above.

Figure 12:
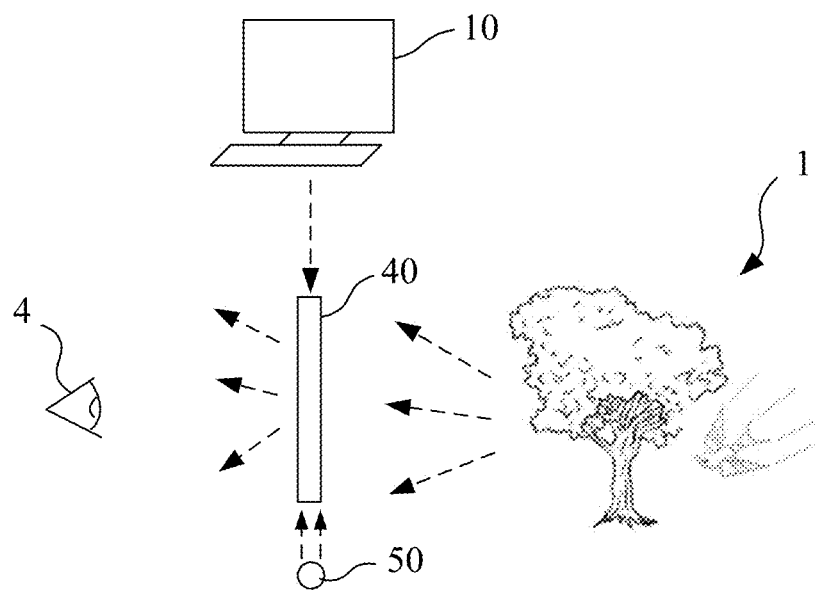
FIG. 12 is a structural schematic of a system for displaying mixed reality content according to an eighth embodiment of the present invention.

FIG. 12 is a structural schematic of the system for displaying mixed reality content according to Embodiment 8 of the present invention. As shown in FIG. 12, the AR display system according to this embodiment includes the above-discussed optical modulation apparatus 40 that is configured to selectively block the passage of light. Reference may be made to the description in connection with Embodiment 8 for structural details of the optical modulation apparatus 40.

In addition, in the optical modulation apparatus 40 according to Embodiment 8, electrical signals for a virtual image are generated from optical signals for the virtual image provided by the display screen, and display modulation signals are generated from the electrical signals for the virtual image and serve as a basis for light modulation by the optical modulation array. That is, the display driver array generates the display modulation signals based on only one set of display input signals. In contrast, in the optical modulation apparatus according to this embodiment, the display driver array generates the display driver signals based on two sets of display input signals, i.e., electrical signals for a virtual image and electrical signals for a real image.

To this end, in addition to the planar light guide plate according to Embodiment 8, the optical modulation apparatus 40 according to this embodiment also includes a virtual display signal unit 140 which is electrically connected to the display driver array in the display driver panel device and is configured to provide electrical signals for a virtual image and send the electrical signals for the virtual image to the display driver array.

Specifically, the AR display system according to this embodiment may operate in a way as detailed blow.

First of all, optical signals from a real image 1 are sent to the optical modulation apparatus 40, based on which, the image sensor array in the optical modulation apparatus 40 generates electrical signals for the real image and send the electrical signals for the real image to the display driver array. At the same time, the virtual display signal unit 140 in the optical modulation apparatus 40 provides electrical signals for a virtual image and send the electrical signals for the virtual image to the display driver array.

Following that, the display driver array generates display modulation signals based on the electrical signal for the real image and the electrical signals for the virtual image and sends the generated signals to the optical modulation array.

Under the effect of the display modulation signals, the optical modulation array accomplishes optical modulation by causing the individual shutters to be open or closed.

As a result, light from the light source 50 exiting the optical modulation array forms a virtual image resulting from the overlaid virtual and real images.

As can be seen from above, the system for displaying mixed reality content according to this embodiment employ the faster responding display driver panel device as defined above. Additionally, capture of the real image directly by the optical modulation apparatus circumvents the issue of a time delay occurring in the signals for the real image. Further, the optical modulation apparatus can perform light modulation based both on the electrical signals for the real image and those for the virtual image so that the light exiting forms the virtual image resulting from the overlaid virtual and real images. This enables synchronized array display and array imaging of the virtual and real images, avoidance of the time delay issue and a significantly improved display effect.

The embodiments disclosed herein are described in a progressive manner, with the description of each embodiment focusing on its differences from other embodiments. Reference can be made between the embodiments for their identical or similar parts.

The foregoing description presents merely a few preferred embodiments of the present invention and does not limit the scope thereof in any sense. All changes or modifications made in light of the above disclosure by any person of ordinary skill in the art fall within the scope of protection set forth in the appended claims.

What is claimed is:

1. A display driver panel device, comprising:
   a substrate having a first surface and a second surface parallel to and facing away from the first surface,
   an image sensor array consisting of pixel sensor elements arranged in M rows and N columns; and
   a display driver array consisting of display driver elements arranged in M rows and N columns, where M is an integer, and N is an integer, wherein:
   the image sensor array and the display driver array are both arranged in the substrate and each of the display driver elements is electrically connected to a corresponding one of the pixel sensor elements;
   the pixel sensor elements receive an external imaging radiation via the first surface of the substrate and send first display input signals to the respective corresponding display driver elements; the display driver elements are configured to receive the first display input signals and generate display driver signals; and the display driver signals are sent out via the second surface of the substrate,
   the display driver panel device further comprising:
   an image sensor control line group consisting of M rows of first lines and N columns of second lines crossing the first lines at right angles; and
   a first display driver control line group consisting of M rows of third lines and N columns of fourth lines crossing the third lines at right angles, wherein:
   the image sensor control line group and the first display driver control line group are both configured in the substrate; each of the pixel sensor elements in the image sensor array is electrically connected to a corresponding pair of the M rows of first lines and N columns of second lines of the image sensor control line group; and each of the display driver elements in the display driver array is electrically connected to a corresponding pair of the M rows of third lines and N columns of fourth lines of the first display driver control line group.

2. The display driver panel device according to claim 1, wherein the pixel sensor elements in the image sensor array and the display driver elements in the display driver array are alternately arranged in a same plane.

3. The display driver panel device according to claim 2, wherein the display driver panel device comprises a light blocking plate provided on the first surface of the substrate, the light blocking plate shading the display driver elements and exposing at least portions of the pixel sensor elements.

4. The display driver panel device according to claim 1, wherein the image sensor array and the display driver array are disposed in parallel to each other with the image sensor array being proximal to the first surface and the display driver array being proximal to the second surface.

5. The display driver panel device according to claim 1, wherein the pixel sensor elements comprise light sensing components each having a light sensing surface facing toward the first surface, the light sensing components configured to receive an external imaging radiation via the first surface and convert optical signals of the external imaging radiation into electrical signals.

6. The display driver panel device according to claim 5, wherein the light sensing components are photodiodes.

7. The display driver panel device according to claim 5, wherein the pixel sensor elements further comprise respective pixel sensor circuits in electrical connection with the light sensing components.

8. The display driver panel device according to claim 1, wherein the pixel sensor elements comprises heat sensing components each having a heat sensing surface facing toward the first surface, the heat sensing components configured to receive an external thermal imaging radiation via the first surface and convert thermal signals of the external thermal imaging radiation into electrical signals.

9. The display driver panel device according to claim 8, wherein the heat sensing components are radiant heat sensing components.

10. The display driver panel device according to claim 1, wherein the pixel sensor elements are configured to detect an X-ray radiation.

11. The display driver panel device according to claim 1, wherein the display driver elements comprise pixel display driver circuits configured to receive the first display input signals.

12. The display driver panel device according to claim 11, wherein the substrate comprises a first semiconductor layer and the pixel sensor elements are disposed in the first semiconductor layer.

13. The display driver panel device according to claim 12, wherein the pixel display driver circuits are disposed in the first semiconductor layer.

14. The display driver panel device according to claim 12, wherein: the substrate further comprises a second semiconductor layer in parallel to the first semiconductor layer with the first semiconductor layer being proximal to the first surface and the second semiconductor layer being proximal to the second surface; and the pixel display driver circuits are arranged in the second semiconductor layer.

15. The display driver panel device according to claim 14, wherein the first semiconductor layer and the second semiconductor layer are arranged in a first chip and a second chip, respectively, or the first semiconductor layer and the second semiconductor layer are both arranged in the first chip.

16. The display driver panel device according to claim 1, wherein the display driver panel device further comprises a virtual display signal unit electrically connected to the display driver array, the virtual display signal unit configured to send second display input signals to the display driver array, the display driver elements configured to generate the display driver signals from the first and second display input signals.

17. The display driver panel device according to claim 16, wherein the display driver panel device further comprises:
a second display driver control line group that consists of M rows of fifth lines and N columns of sixth lines crossing the fifth lines at right angles and is electrically connected to the virtual display signal unit,
wherein the second display driver control line group is configured in the substrate and each of the display driver elements in the display driver array is electrically connected to a corresponding pair of the M rows of fifth lines and N columns of sixth lines of the second display driver control line group so as to allow the second display input signals to be sent to the respective display driver elements.

18. A method for driving a display driver panel device, comprising:
providing a display driver panel device, the display driver panel device comprising: a substrate having a first surface and a second surface parallel to and facing away from the first surface, an image sensor array consisting of pixel sensor elements arranged in M rows and N columns, and a display driver array consisting of display driver elements arranged in M rows and N columns, where M is an integer, and N is an integer, wherein the image sensor array and the display driver array are both arranged in the substrate and each of the display driver elements is electrically connected to a corresponding one of the pixel sensor elements, the display driver panel device further comprising: an image sensor control line group consisting of M rows of first lines and N columns of second lines crossing the first lines at right angles; and a first display driver control line group consisting of M rows of third lines and N columns of fourth lines crossing the third lines at right angles, wherein: the image sensor control line group and the first display driver control line group are both configured in the substrate; each of the pixel sensor elements in the image sensor array is electrically connected to a corresponding pair of the M rows of first lines and N columns of second lines of the image sensor control line group; and each of the display driver elements in the display driver array is electrically connected to a corresponding pair of the M rows of third lines and N columns of fourth lines of the first display driver control line group;
receiving an external imaging radiation via the first surface by the pixel sensor elements and sending first display input signals generated from the external imaging radiation to the respective corresponding display driver elements; and
receiving the first display input signals by the display driver elements, generating display driver signals and sending the display driver signals out via the second surface of the substrate.

19. A display apparatus, comprising:
a display driver panel device, the display driver panel device comprising: a substrate having a first surface and a second surface parallel to and facing away from the first surface, an image sensor array consisting of pixel sensor elements arranged in M rows and N columns, and a display driver array consisting of display driver elements arranged in M rows and N columns, where M is an integer, and N is an integer, wherein the image sensor array and the display driver array are both arranged in the substrate and each of the display driver elements is electrically connected to a corresponding one of the pixel sensor elements, the display driver panel device further comprising: an image sensor control line group consisting of M rows of first lines and N columns of second lines crossing the first lines at right angles; and a first display driver control line group consisting of M rows of third lines and N columns of fourth lines crossing the third lines at right angles, wherein: the image sensor control line group and the first display driver control line group are both configured in the substrate; each of the pixel sensor elements in the image sensor array is electrically connected to a corresponding pair of the M rows of first lines and N columns of second lines of the image sensor control line group; and each of the display driver elements in the display driver array is electrically connected to a corresponding pair of the M rows of third lines and N columns of fourth lines of the first display driver control line group; and an array display consisting of photoelectric display elements arranged in M rows and N columns, the array display disposed on the second surface, the photoelectric display elements corresponding to respective display driver elements in the display driver panel device, wherein the display driver panel device generates and sends display driver signals, and wherein the array display receives the display driver signals via the second surface of the substrate.

20. The display apparatus according to claim 19, wherein the display driver panel device comprises a virtual display signal unit electrically connected to the display driver array, the virtual display signal unit configured to provide second display input signals and send the second display input signals to the display driver array, wherein the display driver array is configured to generate the display driver signals from the first and second display input signals.

21. The display apparatus according to claim 20, wherein the first display input signals are electrical signals for a first image and the second display input signals are electrical signals for a second image.

* * * * *